US012413903B2

(12) United States Patent
Akai et al.

(10) Patent No.: US 12,413,903 B2
(45) Date of Patent: Sep. 9, 2025

(54) EXTERNAL MEMBER, EXTERNAL MEMBER MOLDING METHOD, AND ELECTRONIC INSTRUMENT

(71) Applicant: CASIO COMPUTER CO., LTD., Tokyo (JP)

(72) Inventors: Hiroki Akai, Hino (JP); Hirokatsu Katoh, Kawasaki (JP); Takahiro Moriya, Kokubunji (JP); Yoshihiko Sato, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 214 days.

(21) Appl. No.: 18/082,840

(22) Filed: Dec. 16, 2022

(65) Prior Publication Data

US 2023/0199376 A1 Jun. 22, 2023

(30) Foreign Application Priority Data

Dec. 22, 2021 (JP) ................................ 2021-207674

(51) Int. Cl.
*H04R 1/34* (2006.01)
*H04R 1/02* (2006.01)

(52) U.S. Cl.
CPC ............. *H04R 1/345* (2013.01); *H04R 1/023* (2013.01); *H04R 1/025* (2013.01); *H04R 2201/029* (2013.01); *H04R 2400/11* (2013.01)

(58) Field of Classification Search
CPC .. H04R 1/2811; H04R 2499/11; H04R 1/345; H04R 2499/15; H04R 1/025;
(Continued)

(56) References Cited

U.S. PATENT DOCUMENTS 10,200,784 B2 * 2/2019 Yamazaki ............ H04R 1/2888
10,249,277 B2 * 4/2019 Hoshino .................. G10H 1/32
(Continued)

FOREIGN PATENT DOCUMENTS

EP 1509063 B * 4/2011
EP 1509063 B1 4/2011
(Continued)

OTHER PUBLICATIONS

Japanese Office Action dated Jan. 19, 2023 (and English translation thereof) issued in counterpart Japanese Application No. 2021-207674.
Japanese Office Action (and an English language translation thereof) dated Jun. 18, 2024, issued in counterpart Japanese Application No. 2023-127178.
Extended European Search Report (EESR) dated May 17, 2023, issued in counterpart European Application No. 22213923.0.

*Primary Examiner* — Lun-See Lao
(74) *Attorney, Agent, or Firm* — Holtz, Holtz & Volek PC

(57) ABSTRACT

A rear panel, which is an external member, includes a frame portion including multiple sound radiation holes including a first sound radiation hole, a second sound radiation hole, and a third sound radiation hole. A first sloping portion is disposed within an area of the first sound radiation hole and is inclined with respect to a thickness direction of the frame portion towards a first direction non-parallel to the thickness direction, and a second sloping portion is disposed within an area of the second sound radiation hole and is inclined with respect to the thickness direction of the frame portion towards a second direction different from the first direction and non-parallel to the thickness direction, and the third sound radiation hole includes a surface parallel to the thickness direction of the frame portion.

17 Claims, 12 Drawing Sheets

(58) Field of Classification Search

CPC .. H04R 1/2857; H04R 17/00; H04R 2420/07; H04R 9/025; H04R 9/06; H04R 1/023; H04R 1/26; H04R 1/2803; H04R 19/005; H04R 19/02; H04R 2201/003; H04R 2307/023; H04R 2307/025; H04R 2307/027; H04R 2307/207; H04R 25/00; H04R 27/00; H04R 3/02; H04R 31/003; H04R 31/006; H04R 5/02; H04R 7/04; H04R 7/06; H04R 7/16; H04R 7/20; H04R 7/26; H04R 9/04; H04R 1/026; H04R 1/028; H04R 1/1075; H04R 1/24; H04R 1/2849; H04R 1/2873; H04R 1/288; H04R 1/32; H04R 1/347; H04R 2400/11; H04R 2440/05; H04R 3/12; H04R 7/045; H04R 7/08; H04R 7/10; G06F 1/1656; G06F 1/182; G06F 1/1601; G06F 1/1688; G06F 1/203; G06F 2203/04104; G06F 3/0412; G06F 3/0416; G06F 3/04164; G06F 3/04166; G06F 3/041662; G06F 3/044; G06F 3/0443; G06F 3/0445; G06F 3/0446; G06F 3/167; H04M 1/18; H04M 1/02; H04M 1/0202; H04M 1/035; H04M 1/6033; H04M 3/56; H04M 1/03; H04N 5/642; H04N 5/66; H04N 9/3173

USPC .......................................................... 381/118

See application file for complete search history.

(56) References Cited

U.S. PATENT DOCUMENTS

| | | | | |
|---|---|---|---|---|
| 2003/0188920 | A1* | 10/2003 | Brawley, Jr. | G10K 11/30 181/176 |
| 2005/0129263 | A1* | 6/2005 | Tamura | H04N 5/642 381/333 |
| 2007/0263878 | A1 | 11/2007 | Yu et al. | |
| 2008/0130933 | A1* | 6/2008 | Hayashi | H04R 1/345 381/354 |
| 2018/0182363 | A1 | 6/2018 | Hoshino | |
| 2019/0253792 | A1 | 8/2019 | Ogura et al. | |
| 2020/0236462 | A1 | 7/2020 | Kitagawa et al. | |
| 2021/0168499 | A1 | 6/2021 | Matsuba et al. | |
| 2021/0368260 | A1 | 11/2021 | Ferreira et al. | |

FOREIGN PATENT DOCUMENTS

| | | | |
|---|---|---|---|
| JP | S51131226 | U | 10/1976 |
| JP | S57109683 | U | 7/1982 |
| JP | S5981185 | U | 6/1984 |
| JP | H06062693 | U | 9/1994 |
| JP | 2007041375 | A | 2/2007 |
| JP | 2013183372 | A | 9/2013 |
| JP | 2018105928 | A | 7/2018 |
| JP | 2020190691 | A | 11/2020 |

* cited by examiner

EXTERNAL MEMBER, EXTERNAL MEMBER MOLDING METHOD, AND ELECTRONIC INSTRUMENT

CROSS-REFERENCE TO RELATED APPLICATION

This patent application is based upon and claims the benefit of priority under 35 USC 119 to Japanese Patent Application No. 2021-207674 filed on Dec. 22, 2021, and the content thereof, including the specification, claims, drawings and abstract, is incorporated herein by reference in its entirety.

BACKGROUND

Technical Field

The present disclosure relates to an external member, an external member molding method, and an electronic instrument.

Description of the Related Art

An external member including multiple sound radiation holes like a speaker cover or net has conventionally been used for a sound generating or radiation device such as an electronic instrument or a radio. For example, JP-UM-A-6-62693 discloses a speaker net in which multiple circular sound radiation holes are disposed to be staggered in a zigzag grid-like pattern. This speaker net is attached to a cabinet including a sound hole portion in such a manner as to cover the sound hole portion of the cabinet. A speaker is disposed inside the sound hole portion.

SUMMARY

According to an aspect of the present disclosure, there is provided an external member having a frame portion including multiple sound radiation holes including a first sound radiation hole and a second sound radiation hole, a first sloping portion disposed in the frame portion with a sloping surface oriented in a first direction, the sloping surface being disposed within an area of the first sound radiation hole in such a manner as to slope from a thickness direction of the frame portion, and a second sloping portion disposed in the frame portion with a sloping surface oriented in a second direction which differs from the first direction, the sloping surface being disposed within an area of the second sound radiation hole in such a manner as to slope from the thickness direction of the frame portion.

According to another aspect of the present disclosure, there is provided an electronic instrument including the external cover described above.

According to a further aspect of the present disclosure, there is provided an external member molding method including clamping a mold having a cavity mold including one side of a hexagonal prism including a pair of sloping surfaces formed on facing side surfaces thereof in such a manner as to slope in an identical direction, the one side of the hexagonal prism resulting from dividing the hexagonal prism along a line connecting facing apex portions of the hexagonal prism, and a core mold including a remaining side of the hexagonal prism so divided, and molding a frame portion including a sound radiation hole including a sloping surface within an area of the hole by the hexagonal prism by injecting a molten resin into the mold.

DESCRIPTION OF THE EMBODIMENT

Figure 1:
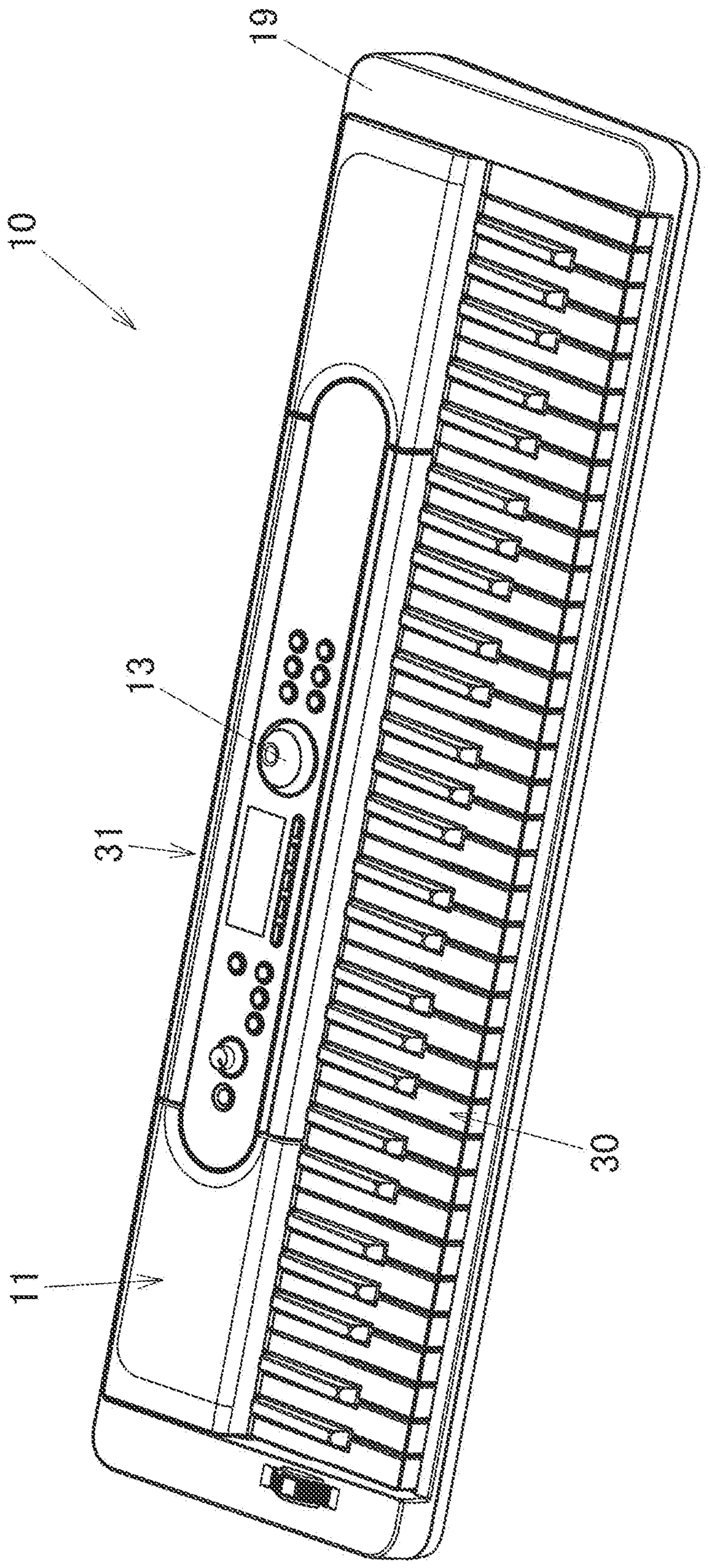
FIG. 1 is a perspective view of an electronic keyboard instrument including an external member (a rear panel) according to an embodiment or application example of the present disclosure.
Figure 2:
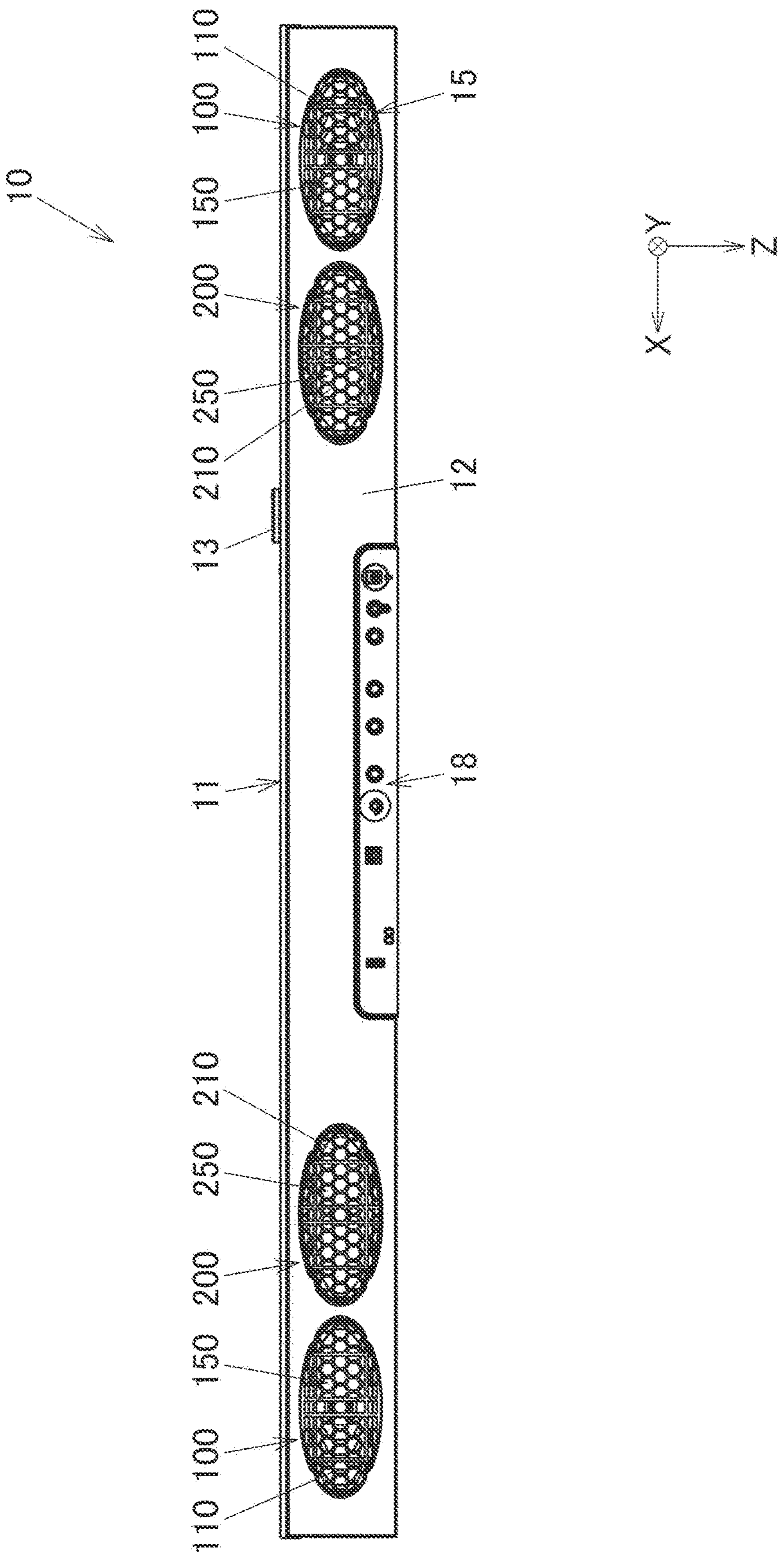
FIG. 2 is a rear view of the electronic keyboard instrument including the external member (the rear panel) according to the application example of the present disclosure.

Hereinafter, referring to accompanying drawings, an embodiment or application example of the present disclosure will be described. An electronic keyboard instrument 10 (an electronic instrument), which is a sound generating device, shown FIG. 1 includes a 61-note keyboard 30 and an instrument case 19. A control section 31 including an adjustment control 13 is provided on an upper surface 11 of the electronic keyboard instrument 10. As shown in FIG. 2, the instrument case 19 includes a rear panel 15, which is an external member, and a rear cover 12, which is disposed on an outer side of the rear panel 15. A connector panel 18, which includes a connection port for an AC adaptor, connection ports for other sound generating or radiation devices, and USB connection ports, is provided at a central portion of a lower part of the rear panel 15 of the electronic keyboard instrument panel 10.

In the following description, an up-down direction of the electronic keyboard instrument 10 is referred to as a Z-axis (a lower side is referred to as a positive side of the Z-axis), a left-right direction of the electronic keyboard instrument 10, which is a direction in which keys are aligned, is referred to as an X-axis (a high-note keys side is referred to as a positive side of the X-axis), and a front-rear direction of the electronic keyboard instrument 10, which is a front-rear direction of a key, is referred to a Y-axis (a nearer side of the key is referred to as a positive side of the Y-axis).

Two first sound radiation sections 100 and two second sound radiation sections 200 are provided in the rear panel 15 of the electronic keyboard instrument 10. Each first sound radiation section 100 has a frame portion 110 which includes multiple sound radiation holes 150, and each second sound radiation section 200 has a frame portion 210 which includes multiple sound radiation holes 250. The first sound radiation section 100 and the second sound radiation section 200 are disposed in series in a direction (an X-axis direction in FIG. 2) which is at right angles to an axial direction of the sound radiation holes 150, 250 (A Y-axis direction in FIG. 2, that is, a thickness direction of the frame portions 110, 210). Then, the two first sound radiation sections 100 are disposed outwards at outer sides (sides farther away from the connector panel 18) of the electronic keyboard instrument 10 in the X-axis direction, and the two second sound radiation sections 200 are disposed inwards at inner sides (sides closer to the connector panel 18) of the electronic keyboard instrument 10 in the X-axis direction. The first sound radiation section 100 and the second sound radiation section 200 which make up a pair at a left side and the first sound radiation section 100 and the second sound radiation section 200 which make up a pair at a right side of the electronic keyboard instrument 10 are provided symmetrically with each other.

Figure 4:
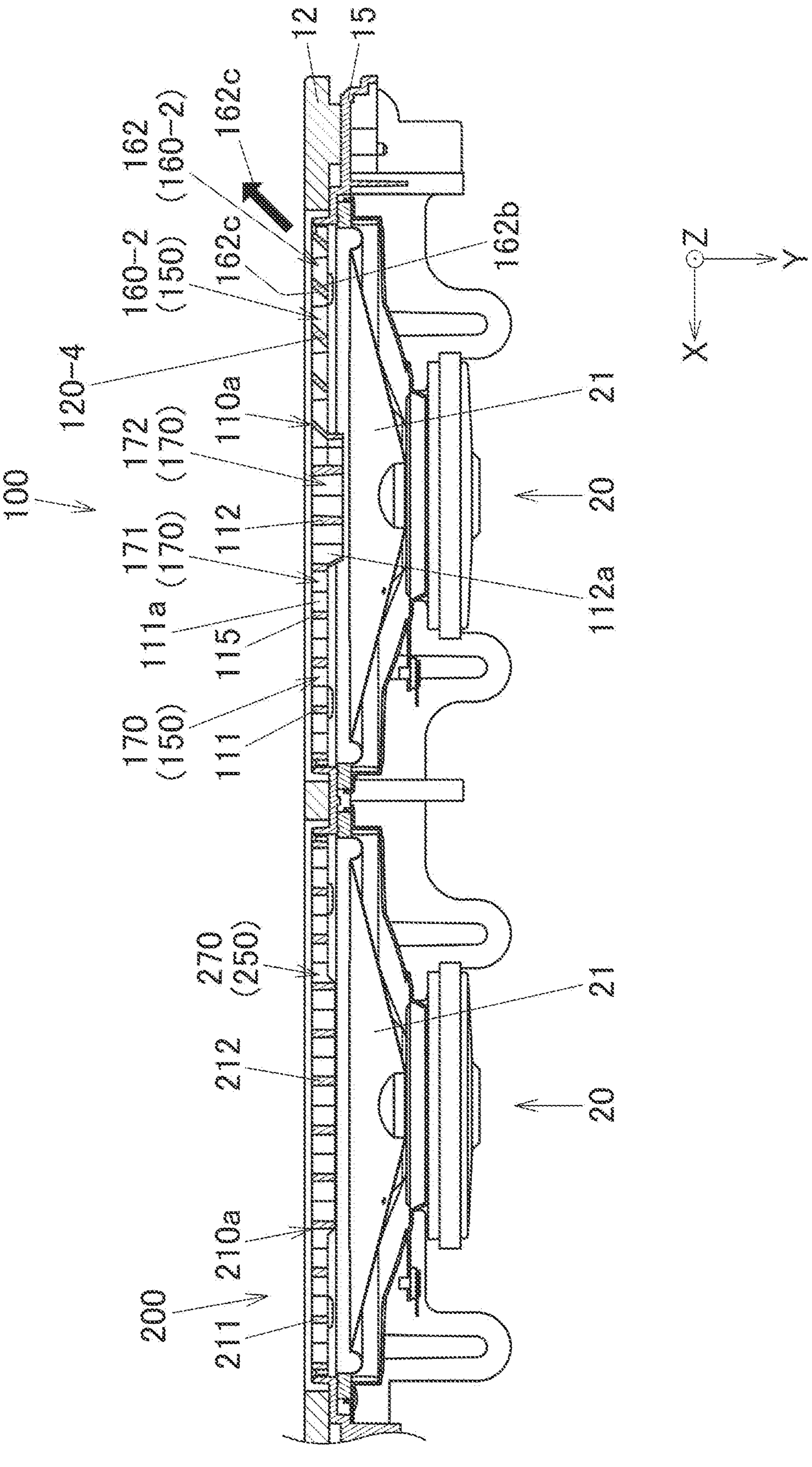
FIG. 4 is a sectional view of the external member (the rear panel) according to the application example of the present disclosure taken along a line IV-IV in FIG. 3.

As shown in FIG. 4, a sound radiation apparatus 20 is provided on an inner side (the positive side of the Y-axis) of the rear panel 15 in such a manner as to correspond individually to the first sound radiation section 100 and the second sound radiation section 200. In the present application example, the sound radiation apparatus 20 is a speaker. The rear panel 15 (the first sound radiation sections 100, the second sound radiation sections 200) is disposed to lie close to the sound radiation apparatuses 20. The rear cover 12 is provided on the outer side of the rear panel 15. In the rear cover 12, portions corresponding to the first sound radiation sections 100 and the second sound radiation sections 200 are opened. Although not shown, a saran net can be provided on an outer surface of the rear cover 12.

Figure 3:
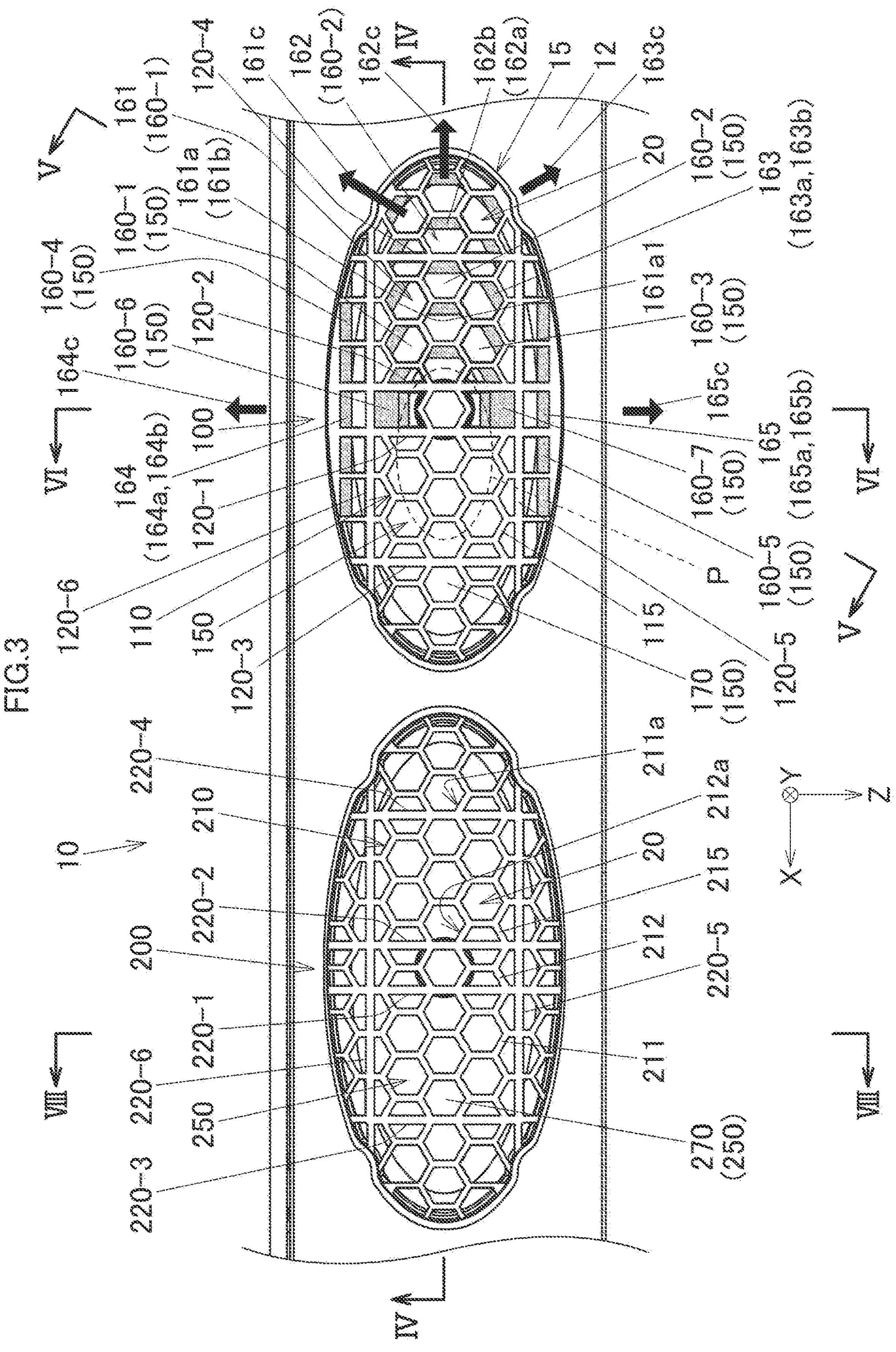
FIG. 3 is an enlarged rear view of the electronic keyboard instrument, showing a first sound radiation section and a second sound radiation section which are provided in the external member (the rear panel) according to the application example of the present disclosure.

As shown in FIG. 3, the frame portions 110, 210 are provided in such a manner that an external shape of an outer edge has a substantially oval shape whose major axis extends in the X-axis direction. The frame portions 110, 210 have multiple frames 115, 215, respectively. When referred to here, the frames 115, 215 denote sides making up, for example, the sound radiation holes 150, 250, respectively, which have a hexagonal shape. The sound radiation holes 150, 250 are provided by areas which are surrounded by the multiple frames 115, 215, respectively. In addition, as shown in FIG. 4, surfaces (outer surfaces 110*a*, 210*a*) of outer sides (a negative side of the Y-axis direction) of the frame portions 110, 210 are formed flat and level with each other.

The first sound radiation section 100 will be described. As shown in FIG. 3, the sound radiation holes 150 provided in the frame portion 110 of the first sound radiation section 100 include multiple first sound radiation holes 160-1 to multiple sixth sound radiation holes 160-6, and multiple isomorphic sound radiation holes 170. The first sound radiation section 100 includes the multiple isomorphic sound radiation holes 170 which are provided on an inner side thereof (a side facing the connector panel 18) in a direction (the X-axis direction) which is at right angles to the thickness direction (the Y-axis direction) of the frame portion 110. The frame portion 110 of the first sound radiation section 100 includes straight-line frames 120-1 to 120-6, which are provided to extend long in a straight line. The straight-line frames 120-1 to 120-4 are provided to extend in the Z-axis direction in parallel to one another in such a manner as to be connected to the outer edge of the frame portion 110. The straight-line frames 120-1, 120-2 are provided to be spaced a predetermined distance apart from each other at a substantially central portion of the frame portion 110 in the X-axis direction, and the straight-line frame 120-1 is disposed inwards, while the straight-line frame 120-2 is disposed outwards.

The straight-line frame 120-3 is disposed inwards of the straight-line frame 120-1 in the x-direction, while the straight-line frame 120-4 is disposed outwards of the straight-line frame 120-2 in the X-axis direction. The straight-line frame 120-4 also include a sloping portion (a second sloping portion 162*b*) at a portion which is superposed on one of sides of a second sound radiation hole 160-2 which form a hexagonal shape. The straight-line frames 120-5, 120-6 are provided to extend in the X-axis direction in parallel to each other in such a manner as to be connected to the outer edge of the frame portion 110. The straight-line frames 120-5, 120-6 are provided in the vicinity of lower and upper outer edges of the frame portion 110 in the Z-axis direction, respectively in such a manner that the straight-line frame 120-5 lies on a lower side, while the straight-line frame 120-6 lies on an upper side.

The multiple polygonal or substantially hexagonal isomorphic sound radiation holes 170 are provided substantially into a honeycomb configuration at a portion of the frame portion 110 which lies inwards in the X-axis direction with respect to the straight-line frame 120-1, which is disposed at a central portion of the frame portion 110, and between the lower and upper straight-line frames 120-5, 120-6. As shown in FIG. 4, the isomorphic sound radiation hole 170 is provided to have substantially the same shape at an inner side and an outer side thereof in an axial direction (the Y-axis direction) of the sound radiation hole 150. Here, when referred to in relation the isomorphic sound holes 170, 171, 270, and the like, the isomorphic sound hole means a hole having substantially the same shape at an inner side and an outer side thereof in the axial direction (the Y-axis direction, that is, the thickness direction of the frame portion 110) of the sound radiation hole 150. The isomorphic sound radiation holes 170 which connect to the outer edge of the frame portion 110 or the straight-line frames 120-5, 120-6 are provided to have a deformed substantially hexagonal shape or a shape resulting when the substantially hexagonal shape is cut into halves.

On the other hand, multiple polygonal or substantially hexagonal first sound radiation holes 160-1 to third sound radiation holes 160-3 are provided substantially into a honeycomb configuration at a portion of the frame portion 110 which lies outwards in the X-axis direction with respect to the straight-line frame 120-2 and between the straight-line frames 120-5, 120-6. The multiple first sound radiation holes 160-1 to third sound radiation holes 160-3 are each aligned in the X-axis direction, while being arranged in three rows in the Z-axis direction. Referring to FIG. 3, the multiple first sound radiation holes 160-1 are aligned horizontally in an upper row, the multiple second sound radiation holes 160-2 are aligned horizontally in a middle row, and the multiple third sound radiation holes 160-3 are aligned horizontally in a lower row. Here, in FIG. 3, sloping surfaces of the first sound radiation holes 160-1 to seventh sound radiation holes 160-7 are shown as being shaded.

Figure 5:
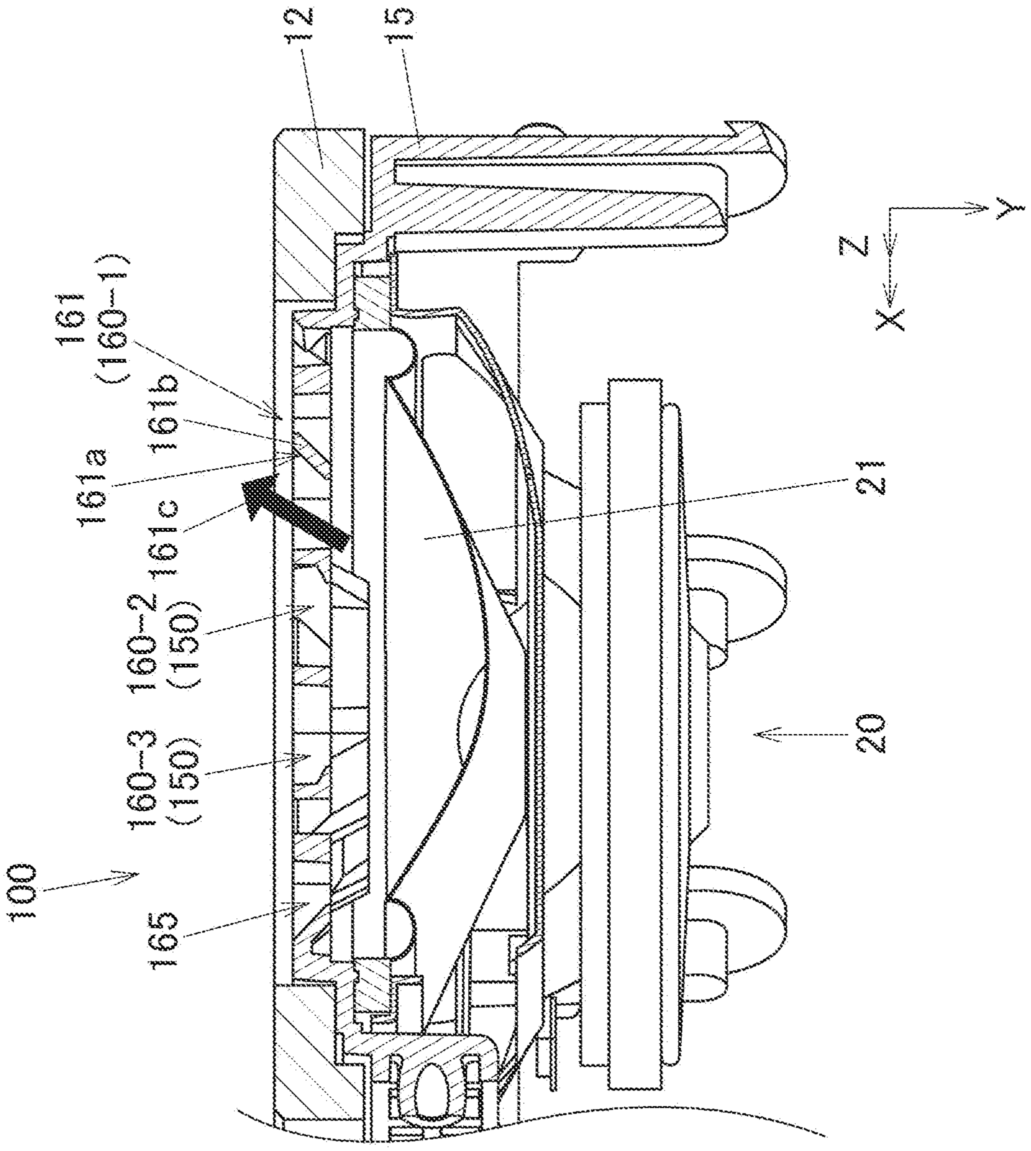
FIG. 5 is a sectional view of the external member (the rear panel) according to the application example of the present disclosure taken along a line V-V in FIG. 3.

The first sound radiation hole 160-1 will be described by taking a first sound radiation hole 161 in the first sound radiation holes 160-1 which is shown in a sectional view in FIG. 5 for example. The first sound radiation hole 161 has a first sloping portion **161*b* including a first sloping surface 161*a* which is disposed to slope down from the thickness direction of the frame portion 110 which is an axial direction of the first sound radiation hole 161 (the Y-axis direction, that is, the thickness direction of the frame portion 110) within an area in the first sound radiation hole 161 (within an area inside the substantially hexagonal shape when seen from above in FIG. 3). A first direction 161*c*, which is a sloping direction of the first sloping surface 161*a* (a direction at right angles to an edge line 161*a*1 of the first sloping surface 161*a* inside the hole, which is a direction directed from an inner side to an outer side of the first sound radiation hole 161**, that is, a sound radiation direction), is a direction which divides an angle formed between a negative side of the X-axis and a negative side of the Z-axis substantially into half angles.

Similarly, a second sound radiation hole 160-2 will be described by taking a second sound radiation hole 162 shown in the sectional view in FIG. 4 for example. The second sound radiation hole 162 has a second sloping portion **162*b* including a second sloping surface 162*a* which is disposed to slope down from the thickness direction of the frame portion 110 which is an axial direction of the second sound radiation hole 162 (the Y-axis direction) within an area in the second sound radiation hole 162. Then, a second direction 162*c*, which is a sloping direction of the second sloping surface 162*a***, constitutes a direction of the negative side of the X-axis.

Also, similarly, a third sound radiation hole 160-3 (a third sound radiation hole 163) has a third sloping portion **163*b* including a third sloping surface 163*a*, and a third direction 163*c*, which is a sloping direction of the third sloping surface 163*a*, constitutes a direction which divides an angle formed between the negative side of the X-axis and a positive side of the Z-axis substantially into half angles. The first direction 161*c*, the second direction 162*c*, and the third direction 163*c*** constitute different directions from one another.

On the other hand, multiple quadrangular fourth sound radiation holes 160-4 and multiple quadrangular fifth sound radiation holes 160-5 are disposed on outer sides of the upper straight-line frame 120-6 and the lower straight-line frame 120-5, respectively. In the fourth sound radiation hole 160-4 (a fourth sound radiation hole 164), a fourth direction **164*c*, which is a direction of the positive side of the Z-axis, constitutes a sloping direction of a fourth sloping surface 164*a* of a fourth sloping portion 164*b*. In the fifth sound radiation hole 160-5 (a fifth sound radiation hole 165), a fifth direction 165*c*, which is a direction of the negative side of the Z-axis, constitutes a sloping direction of a fifth sloping surface 165*a* of a fifth sloping portion 165*b*. The fourth sloping portion 164*b* and the fifth sloping portion 165*b* include the sloping surfaces (the fourth sloping surface 164*a*, the fifth sloping surface 165*a*) which are both disposed to slope down from the thickness direction of the frame portion 110**.

Also, on the other hand, an isomorphic sound radiation hole 172 is provided substantially at a central portion of the frame portion 110 which is defined between the central straight-line frames 120-1, 120-2 in the Z-axis direction and the X-axis direction. The sixth sound radiation hole 160-6 and the seventh sound radiation hole 160-7, which each have a substantially rectangular shape which is elongated in the Z-axis direction, are provided at an upper side (the negative side) and a lower side (the positive side) of the isomorphic sound radiation hole 172 in the Z-axis direction, respectively.

Figure 6:
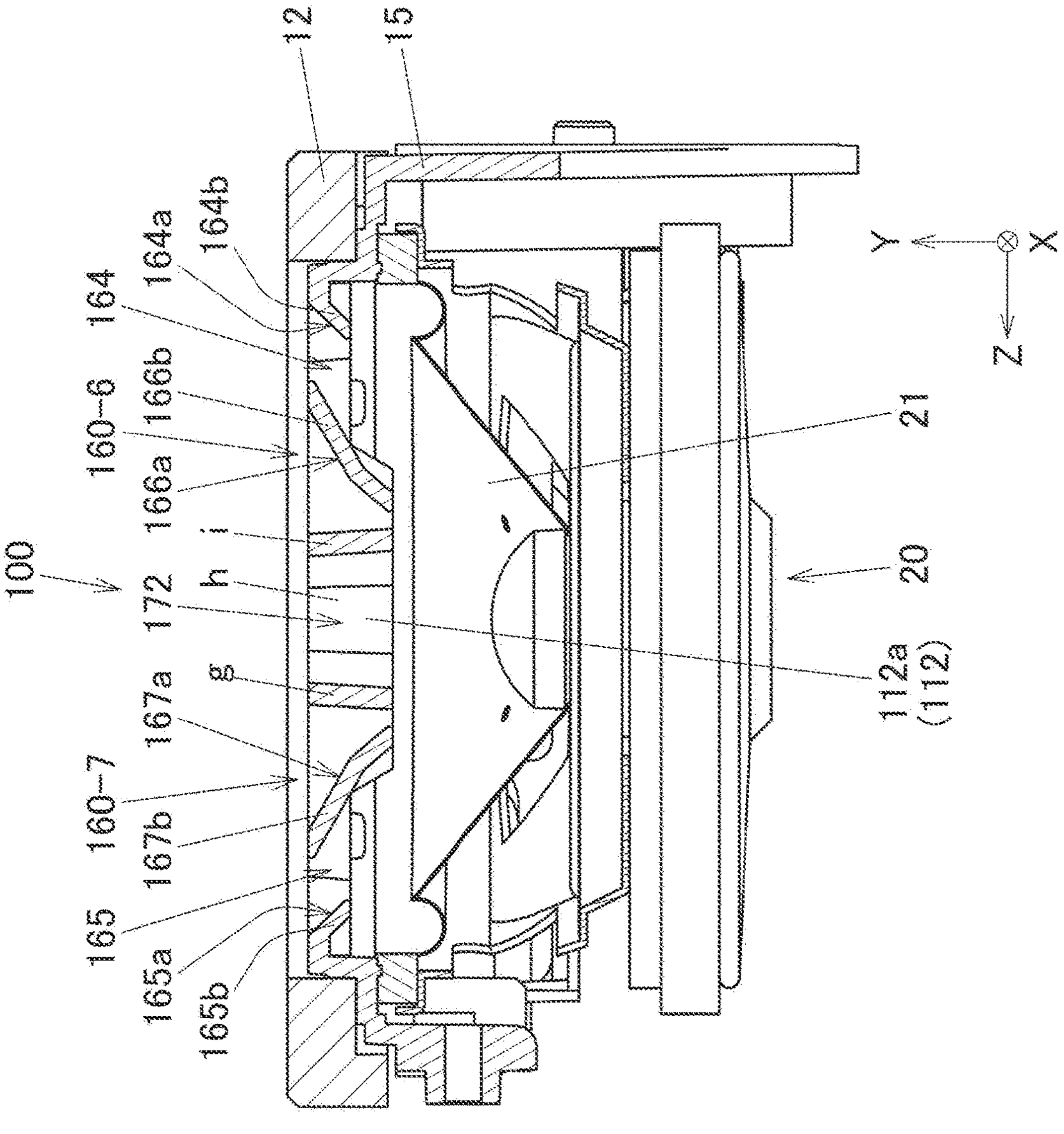
FIG. 6 is a sectional view of the external member (the rear panel) according to the application example of the present disclosure taken along a line VI-VI in FIG. 3.

As shown in FIG. 6, a sixth sloping surface **166*a* of a sixth sloping portion 166*b* of the sixth sound radiation hole 160-6 is disposed to slope down from the thickness direction of the frame portion 110. In other words, the sixth sloping surface 166*a* is provided in such a manner as to expand from the inner side towards the outer side of the frame portion 110. The sixth sloping portion 166*b* includes a bent portion which is provided in such a manner as to be bent in the expanding direction. Similarly, a seventh sloping surface 167*a* of a seventh sloping portion 167*b* of the seventh sound radiation hole 160-7 includes a bent portion, which is similar to that described above, and is disposed to slope down from the thickness direction of the frame portion 110. A sloping direction of the sixth sloping surface 166*a* of the sixth sound radiation hole 160-6 is the same as the fourth direction 164*c*. A sloping direction of the seventh sloping surface 167*a* of the seventh sound radiation hole 160-7 is the same as the fifth direction 165*c*. The sloping portions (the sixth sloping portion 166*b* and the seventh sloping portion 167*b*) which include the sloping surfaces (the sixth sloping surface 166*a* and the seventh sloping surface 167*a*) are both provided between second hole frames 112, which will be described later. Then, the sloping portions (the sixth sloping portion 166*b* and the seventh sloping portion 167*b*) are provided to make a pair so that the sloping surfaces (the sixth sloping surface 166*a* and the seventh sloping surface 167*a***) face each other.

In this way, as shown in FIG. 3, the sound radiation directions from the first sound radiation section 100 include a right-upward direction (the first direction **161*c*) defined by the first sound radiation hole 160-1, a rightward direction (the second direction 162*c*) defined by the second sound radiation hole 160-2, a right-downward direction (the third direction 163*c*) defined by the third sound radiation hole 160-3, an upward direction (the fourth direction 164*c***)

defined by the fourth sound radiation hole 160-4 and the sixth sound radiation hole 160-6, and a downward direction (the fifth direction 165*c*) defined by the fifth sound radiation hole 160-5 and the seventh sound radiation hole 160-7. As a result, sounds radiated from the first sound radiation section 100 can spread widely.

Figure 7A:
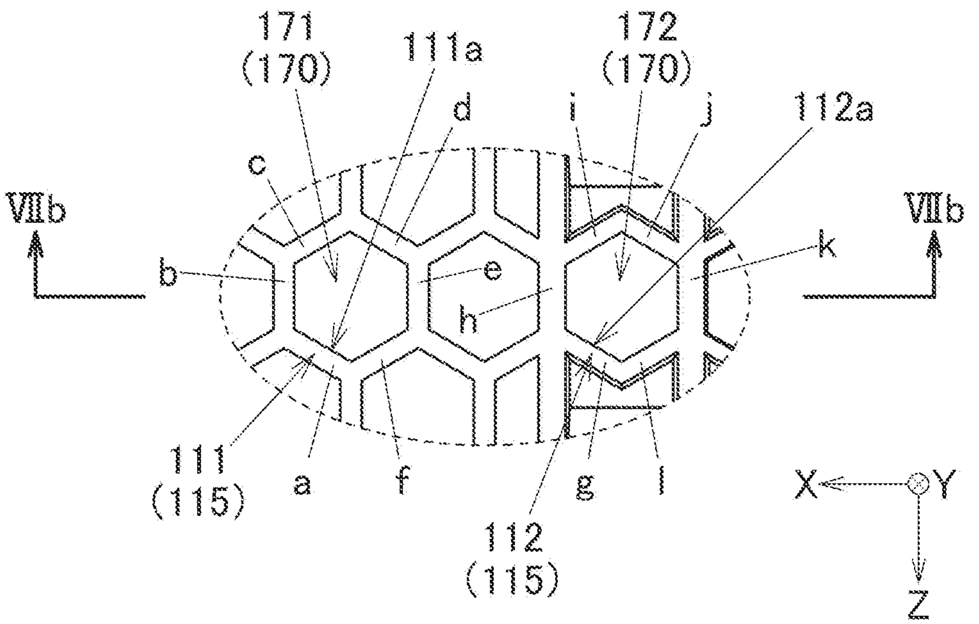
FIG. 7A is an enlarged rear view, which is a partially enlarged view of isomorphic sound radiation portions of the second sound radiation section in the external member (the rear panel) according to the application example of the present disclosure.

Also, here, heights (length in the thickness direction of the frame portion 110 (the Y-axis direction)) of the multiple frames 115 which make up the frame portion 110 of the first sound radiation section 100 will be considered. This will be described by taking isomorphic sound radiation holes 171, 172 shown in FIGS. 7A and 7B for example. The multiple frames 115 which make up the frame portion 110 of the first sound radiation section 100 include first hole frames 111 and second hole frames 112 which include hole forming surfaces which define a sound radiation hole 150. As shown in FIG. 7A, which is an enlarged view of a portion P in FIG. 3, an isomorphic sound radiation hole 171 is made up of respective hole forming surfaces 111*a* of six first hole frames 111 (denoted by reference signs a to f). Similarly, an isomorphic sound radiation hole 172 is made up of respective hole forming surfaces 112*a* of six second hole frames 112 (denoted by reference signs g to l). Here, the hole forming surfaces 111*a*, 112*a* are side surfaces of a hole which extends in the thickness direction of the frame portion 110 (the Y-axis direction). As a result, a length of the hole forming surface is considered based on the thickness direction of the frame portion 110, even though the hole forming surface is shaped to expand as it extends.

Figure 7B:
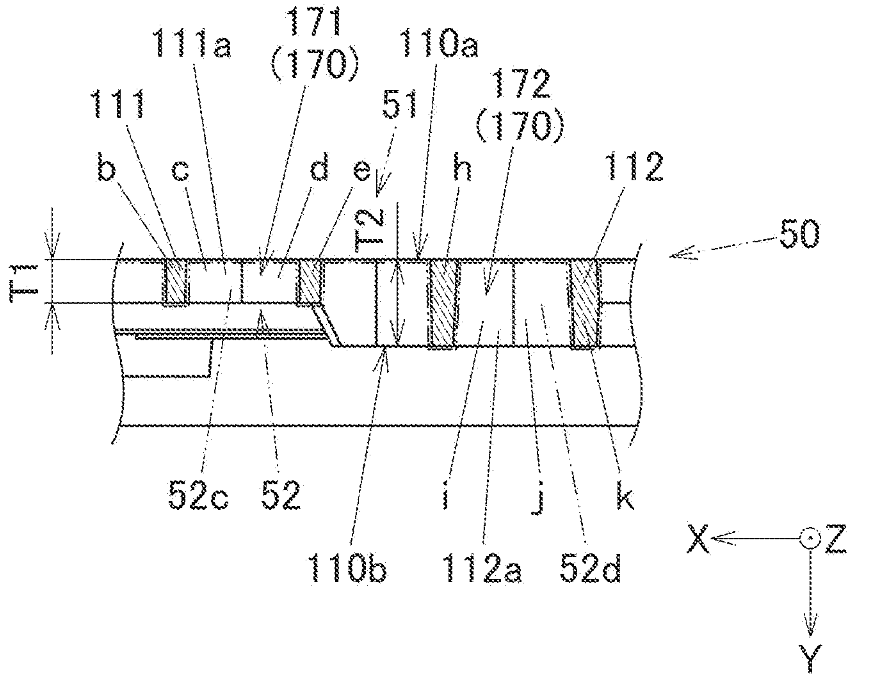
FIG. 7B is a sectional view taken along a line VIIb-VIIb in FIG. 7A, which is a partially enlarged view of the isomorphic sound radiation portions of the second sound radiation section in the external member (the rear panel) according to the application example of the present disclosure.

Then, as shown in FIG. 7B, a length T2 of the hole forming surface 112*a* of the second hole frame 112 in the Y-axis direction of the isomorphic sound radiation hole 172 (the thickness direction of the frame portion 110) is longer than a length T1 of the hole forming surface 111*a* of the first hole frame 111 of the isomorphic sound radiation hole 111*a* in the thickness direction of the frame portion 110. Since the outer surface 110*a* of the frame portion 110 is formed into a flat plane, an inner surface 110*b* of a central portion of the frame portion 110 is made to protrude at the location of the second hole frame 112. As shown in FIG. 4, the second hole frame 112 can be provided in such a manner as to correspond to a central recessed portion of a speaker cone 21 of the sound radiation apparatus 20. Here, the second hole frame 112 includes a portion which is situated in an interior portion of the speaker cone 21. The first hole frame 111 is not situated in the interior portion of the speaker cone 21.

Subsequently, the second sound radiation section 200 will be described. Sound radiation holes 250 provided in the frame portion 210 of the second sound radiation section 200 are made up of multiple isomorphic sound radiation holes 270. In other words, the second sound radiation section 200 includes the frame portion 210 having sound radiation holes 250 which are made up of the isomorphic sound radiation holes 270 in place of the multiple sound radiation holes 150 including the first sound radiation hole 160-1 to the seventh sound radiation hole 160-7 of the first sound radiation section 100. The multiple isomorphic sound radiation holes 270 each have a polygonal or hexagonal shape and are formed substantially into a honeycomb configuration. Additionally, as with the first sound radiation section 100, straight-line frames 220-1 to 220-6 are provided in the frame portion 210 of the second sound radiation section 200.

Figure 8:
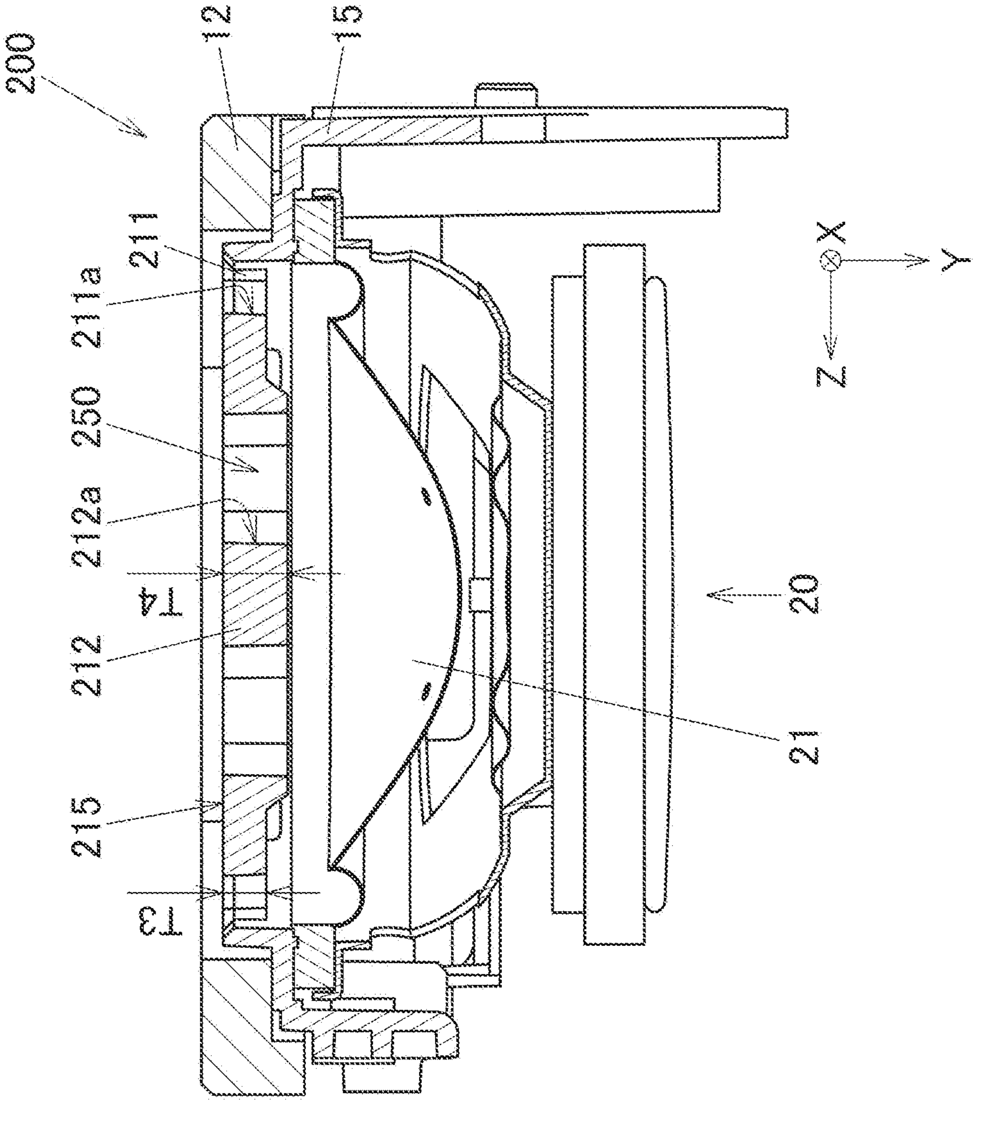
FIG. 8 is a sectional view of the external member (the rear panel) according to the application example of the present disclosure taken along a line VIII-VIII in FIG. 3.
Figure 9:
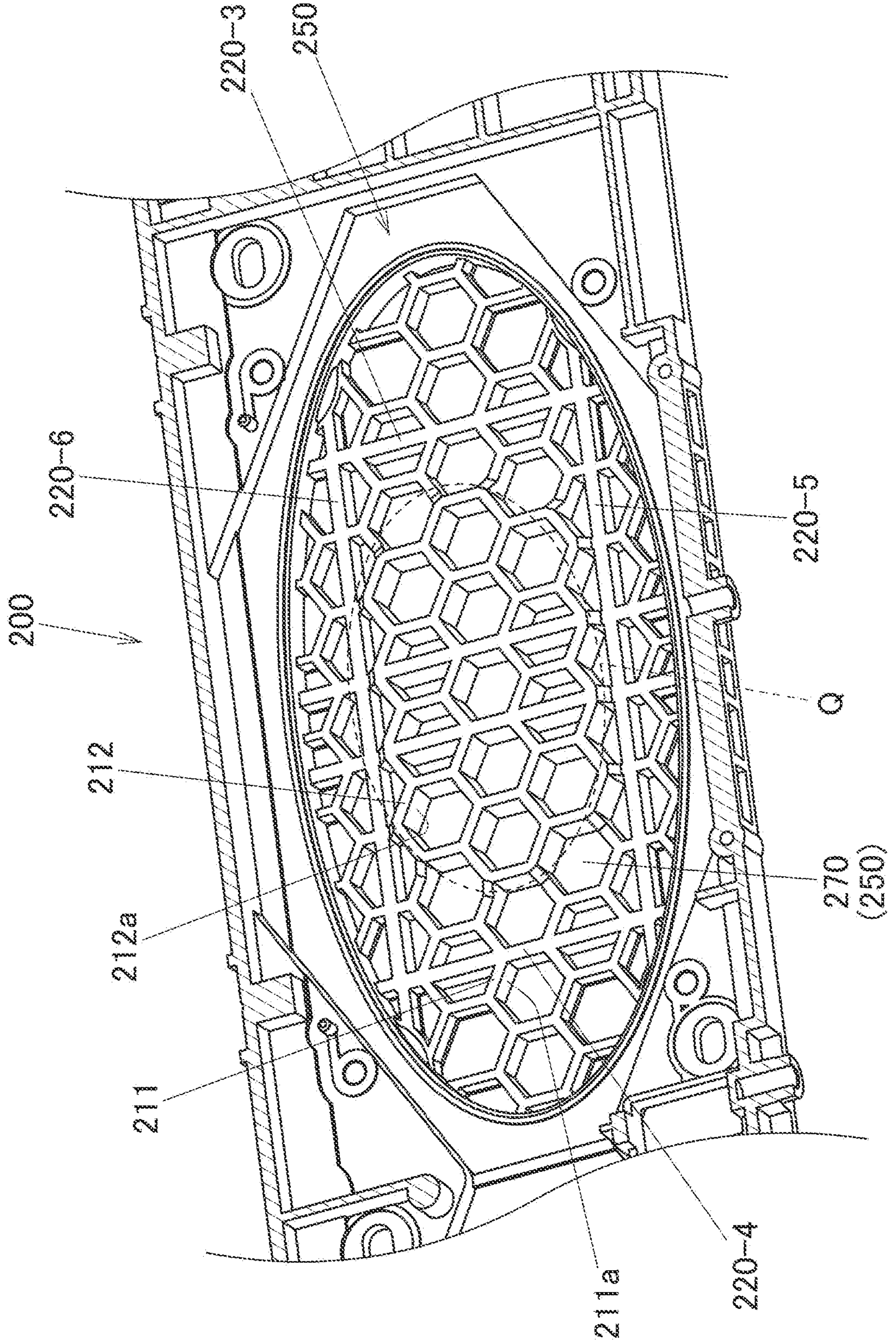
FIG. 9 is a perspective view of the second sound radiation section of the external member (the rear panel) according to the application example of the present disclosure as seen from an inner side thereof.

Next, as shown in FIG. 9, frames 215 of the second sound radiation section 200 include first frames 211 and second frames 212 which include hole forming surfaces 211*a*, 212*a* of sound radiation holes 250, respectively. As shown in FIG. 8, a length T4 of the hole forming surface 212*a* of the second hole frame 212 in an axial direction of the sound radiation hole 250 (the Y-axis direction, a thickness direction of the frame portion 210) is longer than a length T3 of the hole forming surface 211*a* of the first hole frame 211 in the thickness direction of the frame portion 210 (the Y-axis direction). In addition, the length T4 is shorter than the length T2.

Since the second hole frame 112 is given the protruding shape, when seen from the side, with a view to spreading sounds as by the sixth sound radiation hole 160-6 and the seventh sound radiation hole 160-7, the sloping surface is provided long, which results in the fact that the length T2 is made relatively long. On the other hand, since the frame 215 of the second sound radiation section 200 does not have to spread sounds from the viewpoint of sound characteristics, the length T4 is made shorter than the length T2. The disposition of the frame portions 110, 210 is not limited to the application example, and hence, the frame portions 110, 210 can be disposed differently and the lengths T2, T4 can also be changed in accordance with a desired sound characteristic.

In the second sound radiation section 200, a predetermined area Q lying substantially at a central portion of the frame portion 210 is made up of the second hole frames 212 so as to increase the strength of the frame portion 210. In addition, as shown in FIG. 4, the second hole frames 212 can be provided in such a manner as to correspond to the central recessed portion of the speaker cone 21.

Here, the rear panel 15 is molded from a resin through injection molding. As this occurs, a draft expanding from the outer side towards the inner side of the rear panel 15 is provided on hole forming surfaces of the sound radiation holes 150, 250. For example, as shown in FIGS. 7B and 8, a draft is provided on the hole forming surfaces 111*a*, 112*a*, 211*a*, 212*a* as a result of the hole forming surfaces 111*a*, 112*a*, 211*a*, 212*a* expanding slightly from the outer side towards the inner side of the rear panel 15.

Figure 10:
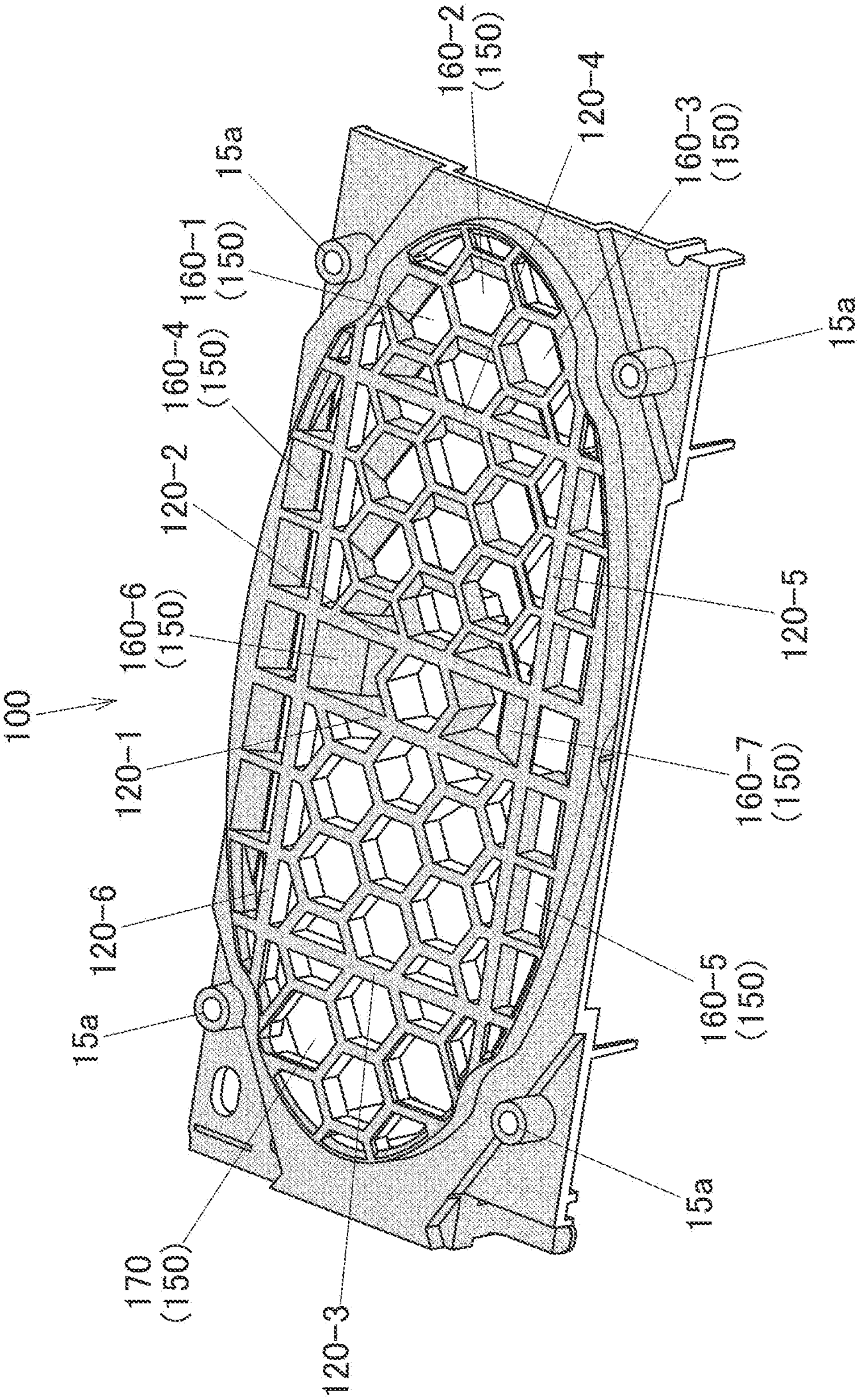
FIG. 10 is a perspective view of the first sound radiation section of the external member (the rear panel) according to the application example of the present disclosure as seen from a front side (an outer side) thereof, in which surfaces to be molded by a core mold are shown as left blank or white, while surfaces to be molded by a cavity mold are shown as shaded.
Figure 11:
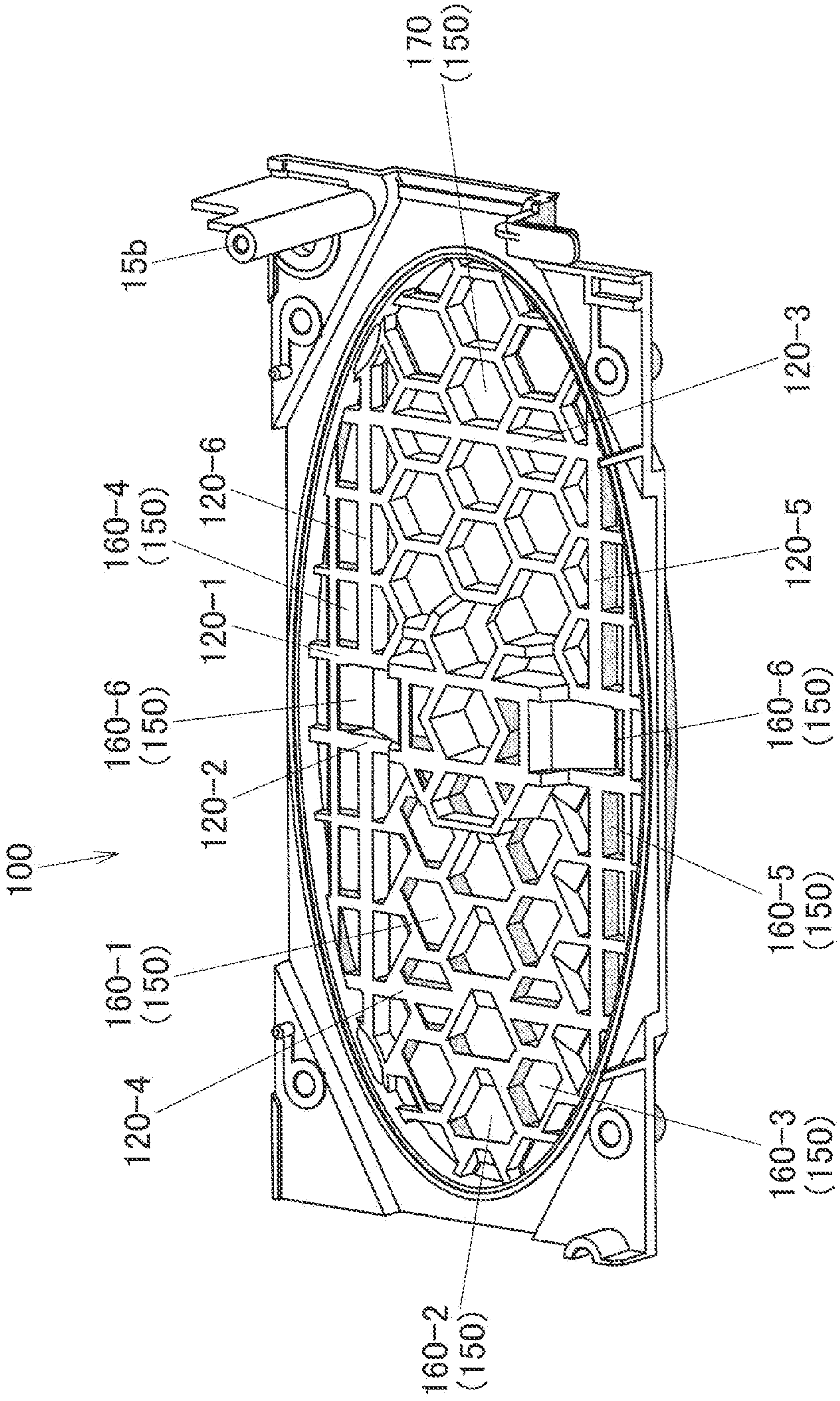
FIG. 11 is a perspective view of the first sound radiation section of the external member (the rear panel) according to the application example of the present disclosure as seen from a rear side (an inner side) thereof, in which surfaces to be molded by the core mold are shown as left blank or white, while surfaces to be molded by the cavity mold are shown as shaded.
Figure 12A:
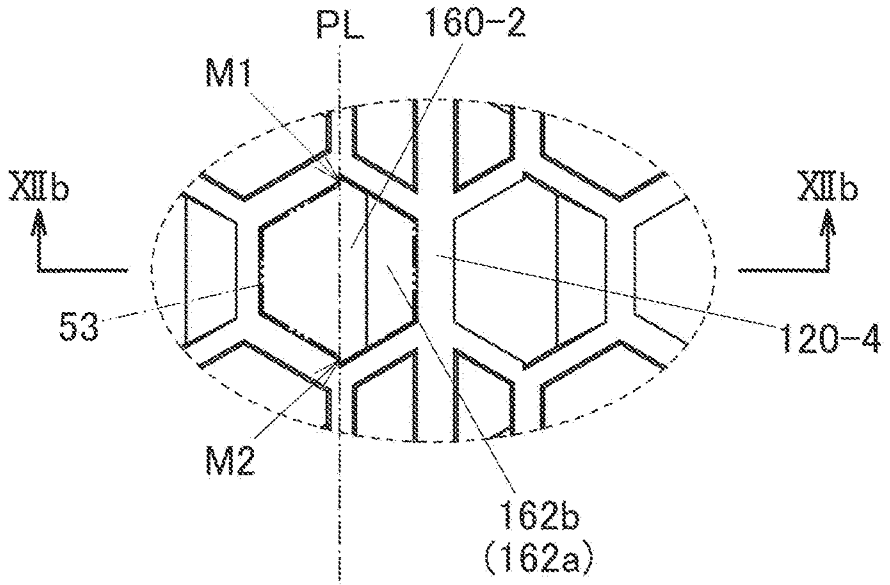
FIG. 12A is an explanatory diagram of a mold for molding the external member (the rear panel) according to the application example of the present disclosure, which is an enlarged rear view of a front side (an outer side) of the second sound radiation hole in the rear panel, which constitutes a product molded by the mold.
Figure 12B:
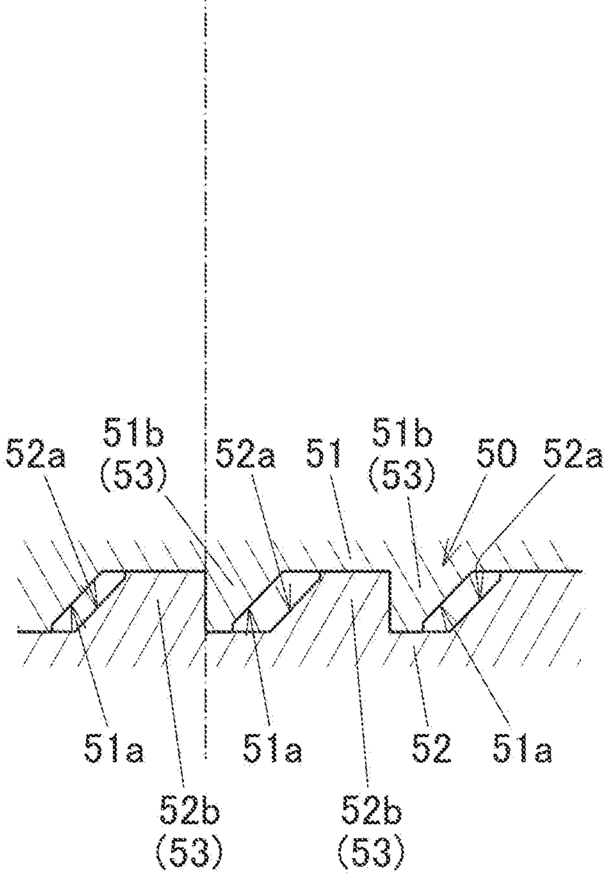
FIG. 12B is an explanatory diagram of the mold for molding the external member (the rear panel) according to the application example of the present disclosure, which is a sectional view of the mold corresponding to a sectional view taken along a line XIIb-XIIb in FIG. 12A.

A mold 50 for molding the rear panel 15 has a cavity mold 51 and a core mold 52. In FIGS. 10, 11 showing the first sound radiation section 100, shaded portions (a front side of the rear panel 15) constitute surfaces to be molded by the cavity mold 51, while blank or white portions constitute surfaces to be molded by the core mold 52. Four bosses 15*a* for attachment of the rear cover 12 are provided on an outer circumference of a front side (an outer side) of the first sound radiation section 100. Then, as shown in FIG. 11, a boss 15*b* for connection with the instrument case 19 of the electronic keyboard instrument 10 is provided on a circumference of a rear side (an inner side) of the first sound radiation section 100.

In molding hexagonal holes in the isomorphic sound radiation holes 170, 270, hexagonal holes can be molded by providing hexagonal prism-like projections on the core mold 52. In molding the first sound radiation hole 160-1 to the third sound radiation hole 160-3, since the sloping portions (the first sloping portion 161*b* to the third sloping portion 163*b*) are provided in the first to third sound radiation holes 160-1 to 160-3, the cavity mold 51 and the core mold 52 are configured as below.

Hexagonal prisms 53 including corresponding sloping surfaces 51*a*, 52*a* which slope in the same direction on facing side surfaces thereof are provided on the mold 50 in such a manner that a pin 51*b*, which constitutes one side or part of the hexagonal prism 53 when the hexagonal prism 53 is divided along a line connecting facing apex portions M1, M2 thereof, is provided on the cavity mold 51 and a pin 52*b*, which is made up of the other side or part of the hexagonal prism 53 so divided, is provided on the core mold 52.

A molding method of the rear panel 15, which constitutes the external member, using this mold 50 includes clamping the mold 50 and injecting a molten resin into the mold 50 so clamped. Then, a frame portion 110 including a first sound radiation hole 160-1 to a third sound radiation hole 160-3 in which sloping surfaces (a first sloping surface 161*a* and the like) are provided within hole areas thereof is molded by the hexagonal prisms 53.

In this way, in the cavity mold 51 and the core mold 52 for molding the first sound radiation hole 160-1 to the third sound radiation hole 160-3, the line connecting the facing apex portions M1, M2 of the hexagonal shape constitutes a parting line PL.

Further, a molding method of the first hole frames 111, 211 and the second hole frames 112, 212 will be described using FIGS. 7A, 7B, which show a circumferential area of the isomorphic sound radiation holes 171, 172 of the first sound radiation section 100. As shown in FIG. 7B, the core mold 52 of the mold 50 includes the first pin 52*c* corresponding to the hole forming surface 111*a* of the first hole frame 111 and the second pin 52*d* corresponding to the hole forming surface 112*a* of the second hole frame 112. Then, the molding method of the rear panel 15 using the mold 50 similarly includes clamping the mold 50 and injecting a molten resin thereinto. Then, a frame portion 110 is molded which includes multiple sound radiation holes 150 including first hole frames 111 and second hole frames 112.

While FIGS. 7A and 7B illustrate the first sound radiation section 100, what is illustrated therein can also equally be applied to the first hole frames 211 and the second hole frames 212 of the second sound radiation section 200.

Thus, as has been described heretofore, the rear panel 15, which is the external member, has the frame portion 110 including the multiple sound holes 150 including the first sound radiation hole 160-1 and the second sound radiation hole 160-2, the first sloping portion 161*b* disposed within the area of the first sound radiation hole 160-1 in such a manner as to be disposed in the frame portion 110 with the first sloping surface 161*a,* which is disposed to slope from the thickness direction of the frame portion 110 (the Y-axis direction), oriented in the first direction 161*c,* and the second sloping portion 162*b* disposed within the area of the second sound radiation hole 160-2 with the second sloping surface 162*a* oriented in the second direction 162*c* which differs from the first direction 161*c*. Here, the frame portion 110 has the first sound radiation hole 160-1 to the fourth sound radiation hole 160-4 whose sound radiation directions (the first direction 161*c* to the fourth direction 164*c*) differ from one another.

As a result, the sound radiation directions (the first direction 161*c* to the fourth direction 164*c*) can be set freely by disposing the sloping surfaces (the first sloping surface 161*a* to the fourth sloping surface 164*a*) of the sloping portions (the first sloping portion 161*b* to the fourth sloping portion 164*b*) within the sound radiation holes 150 (the first sound radiation hole 160-1 to the fourth sound radiation hole 160-4) as required. Thus, even though the adjustment of the orientation of the speakers is difficult due to the limited interior space, the user can listen to sounds which spread widely.

In addition, by giving the first sound radiation hole 160-1 and the second sound radiation hole 160-2 the polygonal shape, the sloping portions (the first sloping portion 161*b* and the second sloping portion 162*b*) can be provided in such a manner as to extend over the sides of the polygonal shape, whereby the sound radiation directions can be set more easily.

Additionally, by giving the first sound radiation hole 160-1 and the second sound radiation hole 160-2 the hexagonal shape, the sound radiation directions can be set in the six directions.

Further, the sound radiation holes 150 of the frame portion 110 include the fourth sound radiation hole 160-4 and the fifth sound radiation hole 160-5, which constitute the quadrangular sound radiation holes 150, and the sloping portions (the fourth sloping portion 164*b,* the fifth sloping portion 165*b*) including the sloping surfaces (the fourth sloping surface 164*a,* the fifth sloping surface 165*a*) which are disposed in such a manner as to slope from the thickness direction of the frame portion 110 (the Y-axis direction) are provided within the areas of the fourth sound radiation hole 160-4 and the fifth sound radiation hole 160-5 while being oriented in the directions which differ from the first direction 161*c* and the second direction 162*c*. As a result, the rear panel 15 can be provided which constitutes the external member which enables sounds to be radiated more widely in terms of sound radiation direction.

In the multiple sound radiation holes 150 including the first sound radiation hole 160-1 and the second sound radiation hole 160-2, in particular, the multiple first sound radiation holes 160-1 to the multiple third sound radiation holes 160-3, and the isomorphic sound radiation holes 170 are each disposed into the honeycomb configuration. As a result, the frame portion 110 having the high strength can be provided.

The rear panel 15, which is the external member, has the first sound radiation section 100 including the frame portion 110 made up of the sound radiation holes 150 including the multiple first sound radiation holes 160-1 and the multiple second sound radiation holes 160-2, and the multiple isomorphic sound radiation holes 170 and the second sound radiation section 200 including the second frame portion 210 made up of the isomorphic sound radiation holes 270 in place of the multiple sound radiation holes 150 including the first sound radiation holes 160-1 and the second sound radiation holes 160-2. As a result, the rear panel 15 can be provided which includes the first sound radiation section 100 configured to radiate sounds widely and the sound radiation holes 250 made up of the isomorphic sound radiation holes 270 configured to radiate dynamic sounds by radiating sounds without closing the sound radiation holes 250.

The two first sound radiation sections 100 are disposed outwards in the direction (the X-axis direction) which is at right angles to the thickness direction of the frame portions 110, 210 (the Y-axis direction), and the two sound radiation sections 200 are disposed inwards of the corresponding first sound radiation sections 100 in the X-axis direction. As a result, the first sound radiation sections 100, which are configured to radiate sounds widely, can be allowed to radiate sounds with good efficiency.

The first sound radiation section 100 includes the isomorphic sound radiation holes which are provided at the half portion thereof which lies inwards in the direction which is at right angles to the thickness direction of the frame portion 110. As a result, the first sound radiation holes 160-1, the second sound radiation holes 160-2, and the like can be provided outwards, and this configuration can reduce the possibility of sounds spreading outwards interfering with sounds radiated in a straight line in the Y-axis direction.

The frame portions 110, 210 are formed into the oval shape as the external shape of the outer edge thereof. As a result, even though the housing of the electronic keyboard instrument 10 is configured small in size by use of the sound radiation apparatus 20 as a speaker having an oval shape, the rear panel 15 can still radiate sounds which spread widely.

In addition, the frame portions 110, 210 are provided to have the oval shape as the external shape of the outer edge thereof. As a result, even though a speaker having an oval shape is installed in a small electronic keyboard instrument, the external member can still radiate sounds which spread widely.

Then, the rear panel 15 is provided in the electronic keyboard instrument 10 as an electronic instrument. As a result, even with the electronic keyboard instrument 10 having a rectangular flat plate-like shape, sounds can be radiated so as to spread widely.

The molding method of the rear panel 15 includes clamping the mold 50 having the cavity mold 51 including the pins 51*b* each constituting the one side or part of the hexagonal prism which results from dividing the hexagonal prism between the pair of sloping surfaces 51*a*, 52*a* formed on the facing sides thereof in such a manner as to slope in the same direction along the line connecting the facing apex portions M1, M2 of the hexagonal prism and the core mold 52 including the pins 52 each constituting the other side or part of the hexagonal prism so divided, and molding the frame portion 110 including the sound radiation holes 150 (the first sound radiation holes 160-1 and the like) including the sloping surfaces (the first sloping surface 161*a* and the like) formed within the areas of the holes (the first sound radiation holes 160-1 and the like) by injecting a molten resin into the mold 50. As a result, the lines connecting the facing apex portions of the hexagonal sound radiation holes 150 (the first sound radiation holes 160-1 and the like) can be made to constitute the parting lines, whereby the cavity mold 51 and the core mold 52 can be provided without making the structure of the mold 50 complex.

While the application example has been described heretofore, the application example is presented as the example, and hence, there is no intention to limit the scope of the present invention by the example. The novel application example can be carried out in other various forms, and various omissions, replacements and modifications can be made thereto without departing from the spirit and scope of the present invention. Those resulting application examples and modified examples thereof are included in the scope and gist of the present invention and are also included in the scope of inventions claimed for patent under claims below and their equivalents.

What is claimed is:

1. An external member comprising:
a frame portion;
a first sloping portion; and
a second sloping portion,
wherein the frame portion comprises multiple sound radiation holes including at least a first sound radiation hole, a second sound radiation hole, and a third sound radiation hole,
wherein the first sloping portion is disposed within an area of the first sound radiation hole and comprises a first sloping surface which is inclined with respect to a thickness direction of the frame portion towards a first direction not parallel to the thickness direction of the frame portion,
wherein the second sloping portion comprises a second sloping surface which is disposed within an area of the second sound radiation hole and which is inclined with respect to the thickness direction of the frame portion towards a second direction which differs from the first direction and which is not parallel to the thickness direction of the frame portion,
wherein each of the first sloping portion and the second sloping portion extends between an inner surface and an outer surface of the frame portion,
wherein the third sound radiation hole comprises a parallel surface which is parallel to the thickness direction of the frame portion, and
wherein at least one of the first sloping surface and the second sloping surface does not overlap with the parallel surface of the third sound radiation hole along the thickness direction of the frame portion.

2. The external member according to claim 1, wherein the first sound radiation hole and the second sound radiation hole each have a polygonal shape.

3. The external member according to claim 2, wherein the multiple sound radiation holes of the frame portion further include a quadrangular sound radiation hole, and
wherein a sloping portion comprising a sloping surface is provided within an area of the quadrangular sound radiation hole, the sloping surface sloping along the thickness direction of the frame portion towards a direction which differs from the first direction and the second direction.

4. The external member according to claim 1, wherein the multiple sound radiation holes are arranged in a honeycomb configuration.

5. The external member according to claim 1, comprising:
a first sound radiation section comprising the frame portion, the frame portion of the first sound radiation section comprising the first sound radiation hole, the second radiation hole, and an isomorphic sound radiation hole whose shapes at an inner side and an outer side in the thickness direction of the frame portion are identical; and
a second sound radiation section comprising a second frame portion, the second frame portion of the second sound radiation section comprising a plurality of the isomorphic sound radiation holes.

6. The external member according to claim 5, wherein the isomorphic sound radiation hole of the first sound radiation section is provided inwards of the first sound radiation hole and the second sound radiation hole thereof in a direction perpendicular to the thickness direction of the frame portion.

7. The external member according to claim 5, wherein a plurality of the first sound radiation sections and a plurality of the second sound radiation sections are disposed in series in the direction perpendicular to the thickness direction of the frame portion,
wherein the plurality of the first sound radiation sections are disposed outwards in the direction perpendicular to the thickness direction of the frame portion, and
wherein the plurality of the second sound radiation sections are disposed inwards in the direction perpendicular to the thickness direction of the frame portion.

8. The external member according to claim 7, wherein the isomorphic sound radiation hole of the first sound radiation section is disposed at an inner half part thereof in the direction perpendicular to the thickness direction of the frame portion.

9. The external member according to claim 1, wherein the frame portion is configured such that an external shape of an outer edge thereof is a substantially oval shape.

10. The external member according to claim 1, wherein a sound radiation apparatus is provided on an inner side of the frame portion along the thickness direction of the frame portion.

11. The external member according to claim 1, wherein the frame portion comprises a plurality of frames, and a frame which is superposed on a side of the second sound radiation hole, from among the plurality of frames, is made into the second sloping portion.

12. The external member according to claim 7, wherein the plurality of the first sound radiation holes and the plurality of the second sound radiation holes are each aligned in a respective row in the direction perpendicular to the thickness direction of the frame portion.

13. The external member according to claim 1, wherein lengths of multiple frames comprising respective hole forming surfaces of the multiple sound radiation holes in the thickness direction of the frame portion are different.

14. The external member according to claim 13, wherein, from among multiple frames comprising respective hole forming surfaces of multiple isomorphic sound radiation holes of the first sound radiation section, a length of a first frame in the thickness direction of the frame portion which is provided at a position corresponding to a central recessed portion of a speaker cone of a sound radiation apparatus is longer than a length of a second frame in the thickness direction of the frame portion which is not provided at a position corresponding to the central recessed portion of the speaker cone of the sound radiation apparatus.

15. The external member according to claim 14, wherein the first frame comprises a portion which is situated in an interior portion of the speaker cone.

16. The external member according to claim 5, wherein a length of a frame in the thickness direction of the frame portion which is provided at a position corresponding to a central recessed portion of a speaker cone of a first sound radiation apparatus, from among multiple frames comprising respective hole forming surfaces of multiple isomorphic sound radiation holes of the second sound radiation section, is shorter than a length of a frame in the thickness direction of the frame portion which is provided at a position corresponding to a central recessed portion of a speaker cone of a second sound radiation apparatus, from among multiple frames comprising respective hole forming surfaces of multiple isomorphic sound radiation holes of the first sound radiation section.

17. An electronic instrument comprising the external member according to claim 1.

* * * * *